(12) United States Patent
Plett (10) Patent No.: US 10,220,898 B1
(45) Date of Patent: Mar. 5, 2019

(54) APPARATUS FOR STORING OBJECTS ABOVE A FLOOR SURFACE

(71) Applicant: Vidir Machine Inc., Arborg (CA)

(72) Inventor: Delmer Plett, Arborg (CA)

(73) Assignee: Vidir Solutions Inc., Arborg (CA)

( * ) Notice: Subject to any disclaimer, the term of this patent is extended or adjusted under 35 U.S.C. 154(b) by 0 days.

(21) Appl. No.: 15/832,092

(22) Filed: Dec. 5, 2017

(51) Int. Cl.
| | |
|---|---|
| *F16M 13/00* | (2006.01) |
| *B62H 3/12* | (2006.01) |
| *F16M 13/02* | (2006.01) |
| *F16M 11/04* | (2006.01) |
| *A47B 57/06* | (2006.01) |
| *A47B 96/14* | (2006.01) |

(52) U.S. Cl.
CPC ............. *B62H 3/12* (2013.01); *F16M 11/04* (2013.01); *F16M 13/027* (2013.01); *A47B 57/06* (2013.01); *A47B 96/1416* (2013.01)

(58) Field of Classification Search
USPC ................. 248/125.8; 254/277, 352
See application file for complete search history.

(56) References Cited

U.S. PATENT DOCUMENTS

| | | | | | |
|---|---|---|---|---|---|
| 3,743,287 | A * | 7/1973 | Liermann | ............. | A63D 15/04 108/149 |
| 4,872,632 | A * | 10/1989 | Johnson | ................ | A47F 5/0892 248/332 |
| 6,095,344 | A * | 8/2000 | White | ....................... | B62H 3/12 211/117 |
| 6,161,702 | A * | 12/2000 | Campbell | ................ | B62H 3/12 211/1.57 |
| 6,234,417 | B1 * | 5/2001 | Sauder | ............... | B65H 75/4442 242/381 |
| 6,237,781 | B1 * | 5/2001 | Dahl | ........................ | B62H 3/12 211/17 |
| 7,150,449 | B1 * | 12/2006 | Dueck | ...................... | B62H 3/12 254/278 |
| 7,370,843 | B2 * | 5/2008 | Dueck | ...................... | B62H 3/12 254/277 |
| 7,481,027 | B2 * | 1/2009 | Blume | ...................... | B62H 3/04 211/17 |
| 8,033,529 | B2 * | 10/2011 | Boda | ........................ | B62H 3/12 254/372 |
| 8,757,397 | B2 * | 6/2014 | Shaha | ...................... | B62H 3/12 211/17 |
| 9,988,118 | B1 * | 6/2018 | Hall | ......................... | B62H 3/12 |
| 2006/0080904 | A1 * | 4/2006 | Shaha | ...................... | E04H 6/42 52/79.1 |

(Continued)

*Primary Examiner* — Monica E Millner
(74) *Attorney, Agent, or Firm* — Adrian D. Battison; Ade + Company Inc.; Ryan W. Dupuis (57) ABSTRACT

An apparatus for storing objects above a floor surface comprises an endless loop driven for rotation about a pair of longitudinally spaced parallel axes, a plurality of pulleys at longitudinally spaced locations supported for rotational movement about axes oriented transversely, and a plurality of flexible links coupled to the endless loop and extending therefrom to a respective one of the pulleys about which each link wraps and extends downwardly to a support member for carrying the objects above the floor. Thus in rotation of the endless loop the flexible links are retracted or dispensed from a housing where the endless loop is located so as to raise or lower the support member.

15 Claims, 12 Drawing Sheets

(56) References Cited

U.S. PATENT DOCUMENTS

| | | | |
|---|---|---|---|
| 2012/0068133 A1* | 3/2012 | Ozarski | B62H 3/12 254/364 |
| 2012/0079769 A1* | 4/2012 | Krause | B62H 3/00 49/70 |
| 2013/0230378 A1* | 9/2013 | Fisher | B66D 3/22 414/800 |
| 2014/0191101 A1* | 7/2014 | Krause | B62H 3/12 248/331 |
| 2017/0320669 A1* | 11/2017 | Kilibarda | B65G 1/023 |

* cited by examiner

APPARATUS FOR STORING OBJECTS ABOVE A FLOOR SURFACE

FIELD OF THE INVENTION

The present invention relates generally to an apparatus for storing objects above a floor surface, often called an overhead storage system in industry, and more specifically to an arrangement in such an apparatus for raising and lowering a support member carrying the objects in storage above the floor surface.

BACKGROUND

Prior art apparatuses for storing objects above a floor surface, which may be referred to as overhead storage systems as they are often known in industry, comprise a drive arrangement for raising and lowering a support member on which the objects are supported for storage above the floor surface. Conventionally, the drive arrangement includes flexible links such as straps or cables that are wrapped onto spools for raising the support member.

One shortcoming of such prior art apparatuses includes uneven wrapping of spools which results in uneven travel distance of the depending flexible links and, consequently, changes in orientation of the support member as it is raised, which typically is not desirable. Another shortcoming includes inconsistent lifting capacity and travel speed of the depending links, and a further shortcoming may be less speed and more power at initial wrapping of the links about the spools.

SUMMARY OF THE INVENTION

According to an aspect of the invention there is provided an apparatus for storing objects above a floor surface, comprising:

a housing, which is elongated in a longitudinal direction, arranged for mounting at a prescribed height above the floor surface;

an endless loop driven for rotational movement about a pair of spaced parallel axes defined by members carried at the housing;

the endless loop having first and second runs of the loop which extend substantially parallel to the longitudinal direction, the first and second runs being movable in opposite directions in the rotational movement of the endless loop;

a plurality of pulleys at longitudinally spaced locations of the housing which are supported for rotational movement about axes oriented in a transverse direction to the longitudinal direction;

a plurality of flexible links coupled to the endless loop and each extending therefrom substantially parallel to the longitudinal direction to a respective one of the pulleys;

the flexible links wrapping about the pulleys so as to depend downwardly therefrom;

a support member for carrying the objects above the floor surface that extends substantially parallel to the longitudinal direction of the housing and is coupled to the flexible links so that the rotational movement of the endless loop causes the support member to be raised and lowered;

a first one of the flexible links being coupled to the first run of the endless loop and a second one of the flexible links being coupled to the second run;

and each of the first and second flexible links extending from a respective coupling location to a corresponding one of the pulleys in an opposite direction to the other one of the first and second flexible links so that rotation of the endless loop in a predetermined rotational direction causes the respective coupling locations of the first and second flexible links to be displaced in opposite directions whereby both the first and second flexible links are retracted into the housing or extended therefrom so as to cooperate to raise or lower the support member.

This arrangement provides an apparatus with a plurality of lift points defined by the flexible links having consistent lifting distance, lifting capacity, and travel speed as each flexible link is coupled to a common drive member, which is defined by the endless loop, that when operated to rotate each coupling location to the common drive member is displaced by the same distance.

There may be more than one of the flexible links extending in a common one of the opposite directions from respective coupling locations to corresponding ones of the pulleys.

In one arrangement the more than one of the flexible links extending in the common one of the opposite directions are coupled to a common mounting member which is fixedly attached to the endless loop.

In such an arrangement, it is preferred that the flexible links coupled to the common mounting member are arranged on either side of the respective run of the endless loop.

The pulleys from which the flexible links depend downwardly may be located to rotate in different planes of rotation.

The pulleys from which the flexible links depend downwardly may be spaced from one another in a direction perpendicular to the longitudinal direction of the housing.

Each flexible link at its coupling location to the endless loop may be spaced from the other in a direction perpendicular to the longitudinal direction of the housing. Such an arrangement is preferred when there is provided the common mounting member supporting a plurality of the flexible links.

In one arrangement the endless loop is positioned to rotate in an upright plane of rotation.

Preferably, in such an arrangement, the respective flexible link coupled to a lower one of the first and second runs of the endless loop follows an inclined path therefrom to the corresponding one of the pulleys.

Preferably, in such an arrangement, the respective flexible link coupled to the lower one of the first and second runs is passed over an intermediary pulley in its path to the corresponding one of the pulleys wherefrom the respective flexible link depends downwardly. Therefore, generally speaking flexible links may be supported by more than one pulley in the apparatus.

In one arrangement of the apparatus:
one of the pulleys, from which the flexible links depend downwardly, is located, with respect to the longitudinal direction of the housing, along one of the first and second runs of the endless loop;
and the respective flexible link corresponding to said one of the pulleys extends from its respective coupling location in the longitudinal direction to an intermediary pulley disposed at a longitudinally spaced location from the endless loop, the respective flexible link wrapping about the intermediary pulley and extending therefrom in an opposite longitudinal direction to said one of the pulleys from which the respective link depends downwardly.

As such, the respective coupling location of the respective link, which depends downwardly from that pulley coinciding in longitudinal location with one of the runs of the endless loop, has a range of movement along a length of the run of the loop, at which the link is coupled, unobstructed by said pulley.

Typically, the intermediary pulley that is longitudinally spaced from the endless loop is positioned to rotate in a plane of rotation transverse with respect to a plane of rotation of the endless loop. Thus, the link is redirected by this intermediary pulley, in its path to the pulley from which it depends downwardly, to a location spaced from the plane of rotation of the endless loop.

In one arrangement each of the first and second runs of the endless loop are encompassed by a separate tubular member extending along a respective one of the first and second runs.

In one arrangement there are provided skid members extending along a respective one of the first and second runs of the loop positioned to lie in a plane of rotation of the endless loop.

Typically, each flexible link has a different length from its respective coupling location to the support member.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

The accompanying figures show an apparatus 10 for storing objects, for example bicycles in a vertical hanging position, above a floor surface S (schematically shown). In industry, apparatuses such as these are often termed overhead storage systems.

The apparatus 10 comprises a housing 12 mountable at a prescribed height H above the floor surface S, typically to a building's rafter system for example by U-shaped brackets 13 so as to be suspended from the ceiling of the building at a fixed location. The housing 12 of the illustrated arrangement is formed by a pair of vertically spaced tubes 14A and 14B elongated in a longitudinal direction and interconnected by a pair of longitudinally spaced plates 16, 17.

The apparatus 10 further includes an endless loop in the form of a chain 19 which is supported for rotational movement in the housing 12 about a pair of spaced parallel axes 21 and 22. The parallel axes 21, 22 are defined by transmission members that are supported in a fixed location at the housing, which in the illustrated arrangement are in the form of sprockets 24 and 25 supporting the chain 19. At least one of the sprockets 24, 25 is driven by a motor 28. In the illustrated arrangement, the drive sprocket 24 is driven by the motor 28 through a worm gear transmission 29 effecting coupling of the sprocket 24 to the motor. There is provided a brake 31 for braking the motor. Also, a controller 32 is provided for operating the motor at a remote distance from the housing 10 whereat the motor is located.

The drive chain 19 forms first and second runs 33, 34 between the pair of parallel axes 21, 22 which are located at opposite ends of the loop. In the illustrated arrangement the runs 33, 34 of the chain extend parallel to the longitudinal direction (thus, at the least they are substantially parallel thereto), and therefore the parallel axes 21, 22 are longitudinally spaced apart with respect to the housing 10.

A plane of rotation $P_L$ of the drive chain is oriented vertically upright so that the runs 33, 34 form an upper run and a lower run. Therefore, the parallel axes 21, 22 about which the drive chain 19 rotates are oriented horizontally.

The upper run 33 of the chain is enclosed around its transverse periphery by an upper one 14A of the housing tubes, while the lower run 34 is enclosed around its transverse periphery by a lower one 14B of the housing tubes, such that each run is encompassed by a distinct and separate tubular member extending along a respective one of the upper and lower runs.

Further to the forgoing components of the apparatus, there is provided a plurality of dispensing pulleys 36A-D at longitudinally spaced locations of the housing, and a plurality of flexible support links 39A-D in the form of cables that are coupled to the drive chain 19. Each support cable extends from a respective coupling location 40A-D at the chain 19 and follows a path to a corresponding one of the dispensing pulleys 36A-D, about which the cable wraps and then depends in a downward direction towards the floor surface.

At ends of the support cables distal to the chain 19 is coupled a common elongated support member in the form of a beam 41 (schematically shown) adapted to carry the objects above the floor surface, for example by hooks 42 connected thereto from which objects can be hung. In the illustrated arrangement, the beam 41 extends parallel to the longitudinal direction of the housing. The apparatus 10 is arranged to raise and lower the support member which is supported by the cables 39A-D, as will be described in further detail hereinafter. In the illustrated arrangement, there is provided a metal chain link 43 at the distal end of each support cable interconnecting each support cable and the horizontal support beam 41 so as to couple the beam to the support cables.

Figure 7:
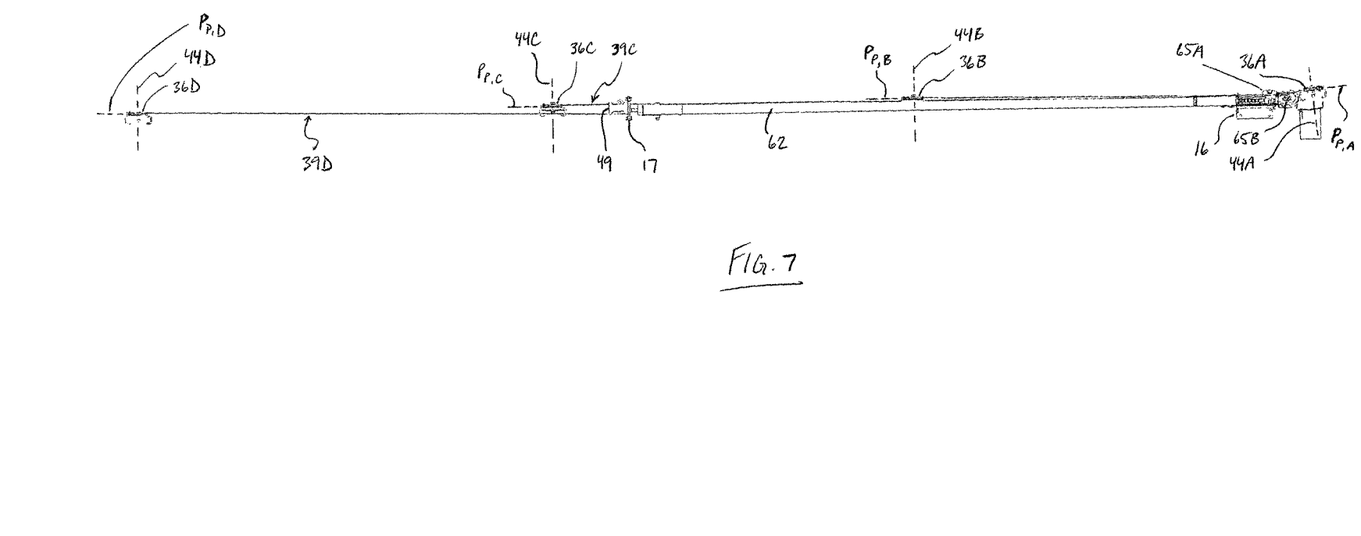
FIG. 7 is a bottom plan view of the arrangement of FIG. 1 in which some components are omitted for clarity of illustration.
Figure 8:
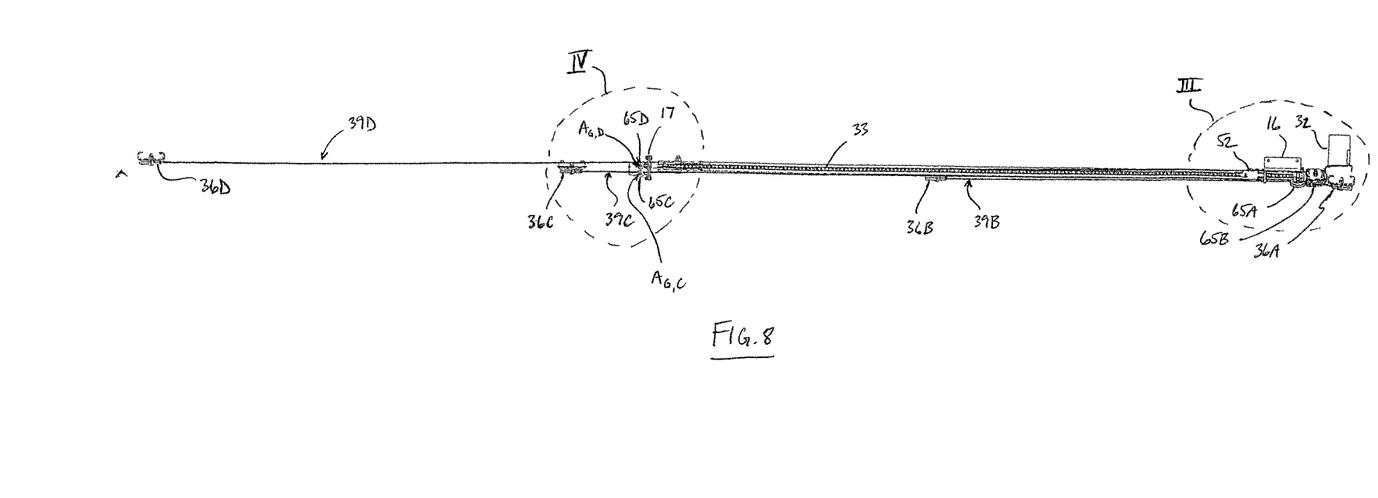
FIG. 8 is a top plan view of the arrangement of FIG. 1 in which some components are omitted for clarity of illustration.
Figure 9:
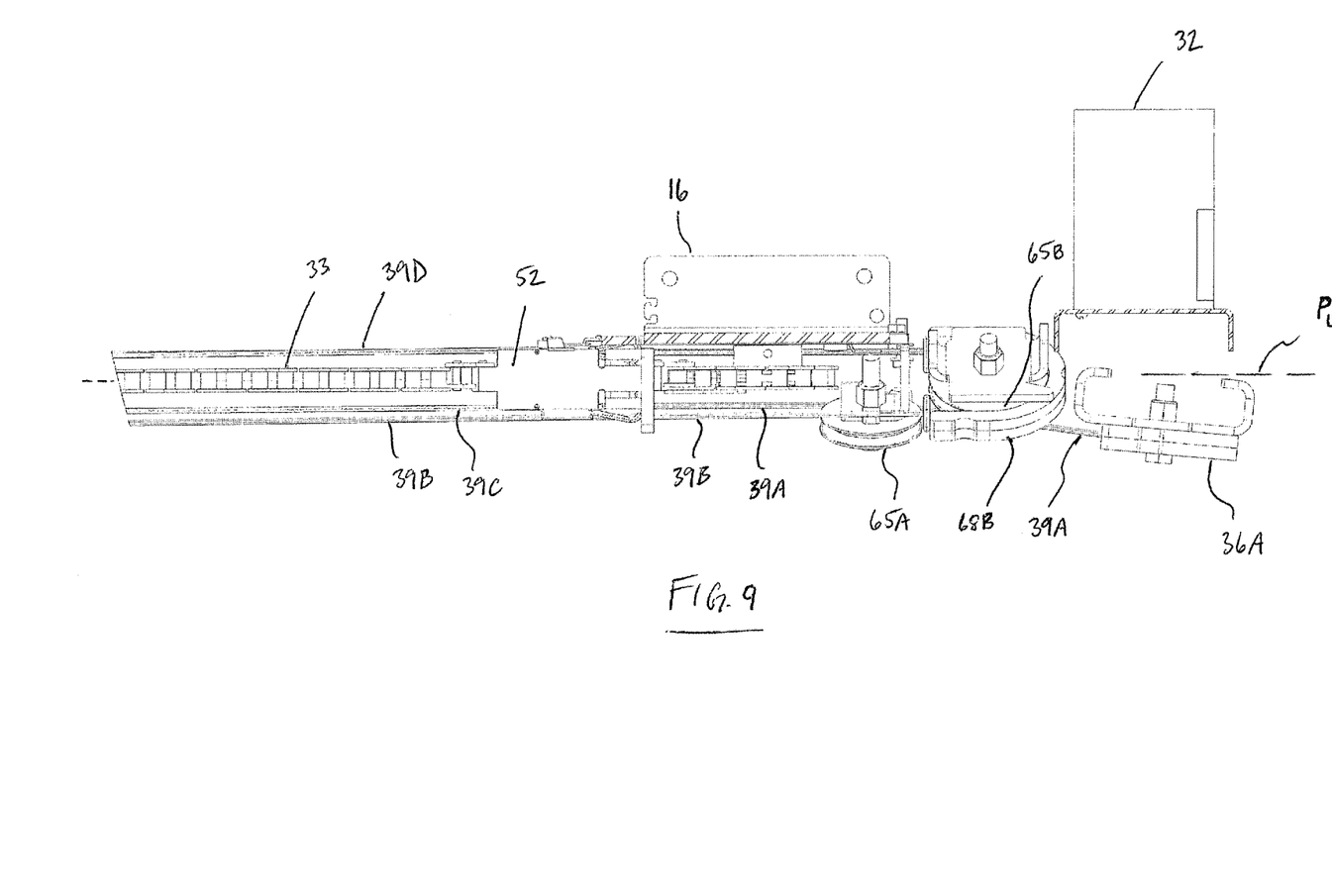
FIG. 9 is an enlarged partial view indicated at III in FIG. 8 in which some components are omitted for clarity of illustration.
Figure 10:
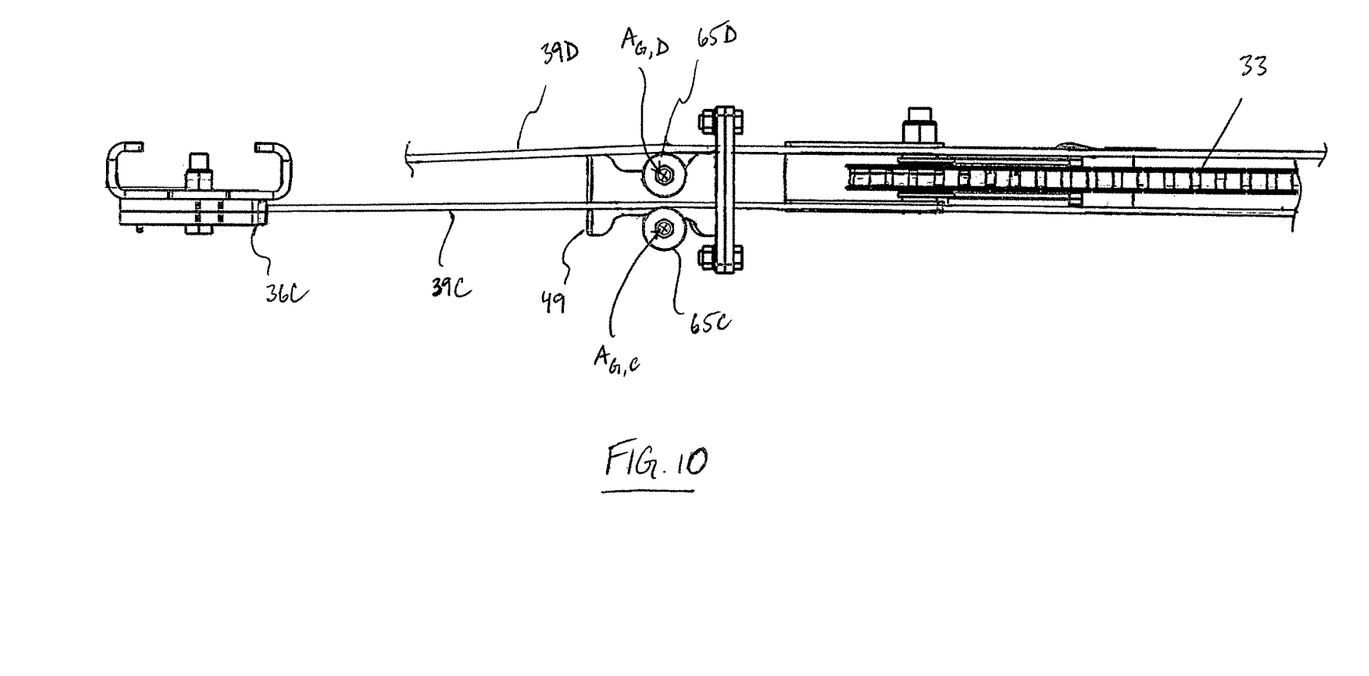
FIG. 10 is an enlarged partial view indicated at IV in FIG. 8 in which some components are omitted for clarity of illustration.
Figures 11, 12:
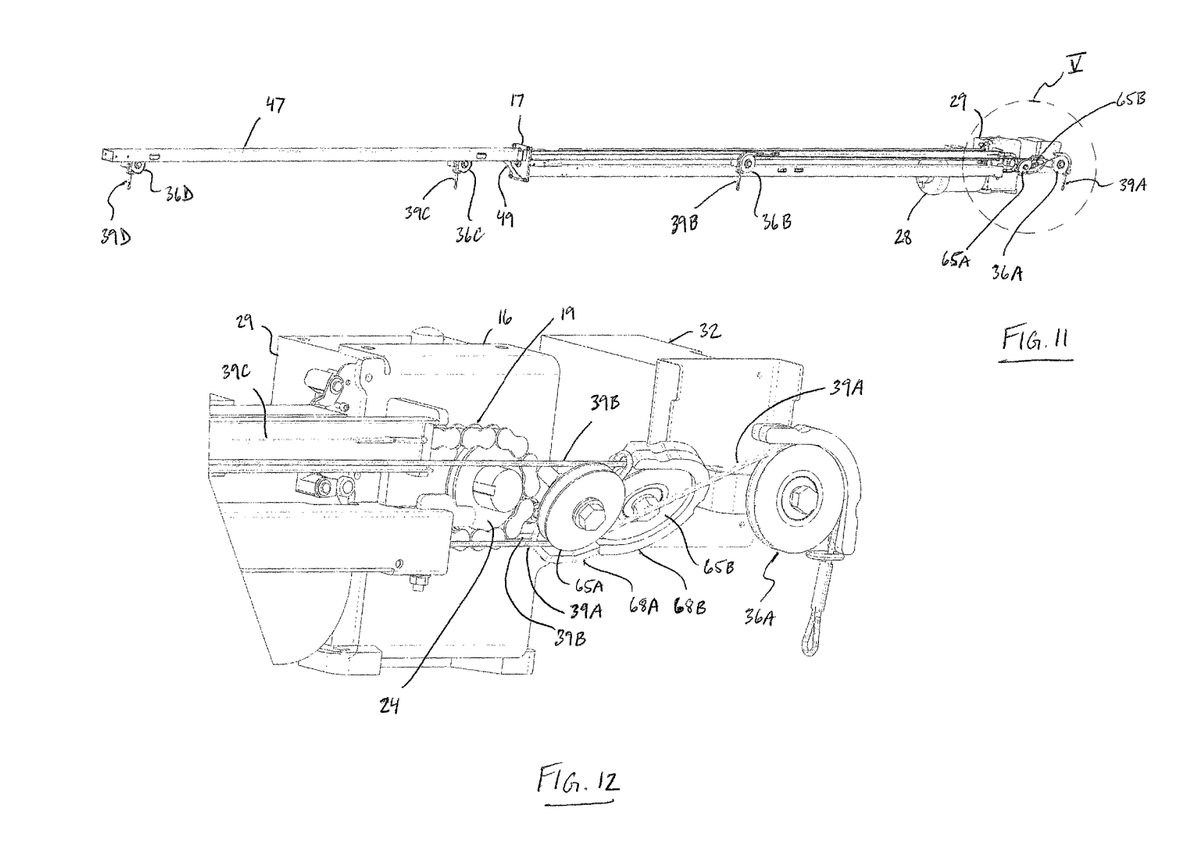
FIG. 11 is another perspective view of the arrangement of FIG. 1 omitting some components for clarity of illustration.
FIG. 12 is an enlarged partial view indicated at V in FIG. 11 with some components omitted for clarity of illustration.
Figure 13:
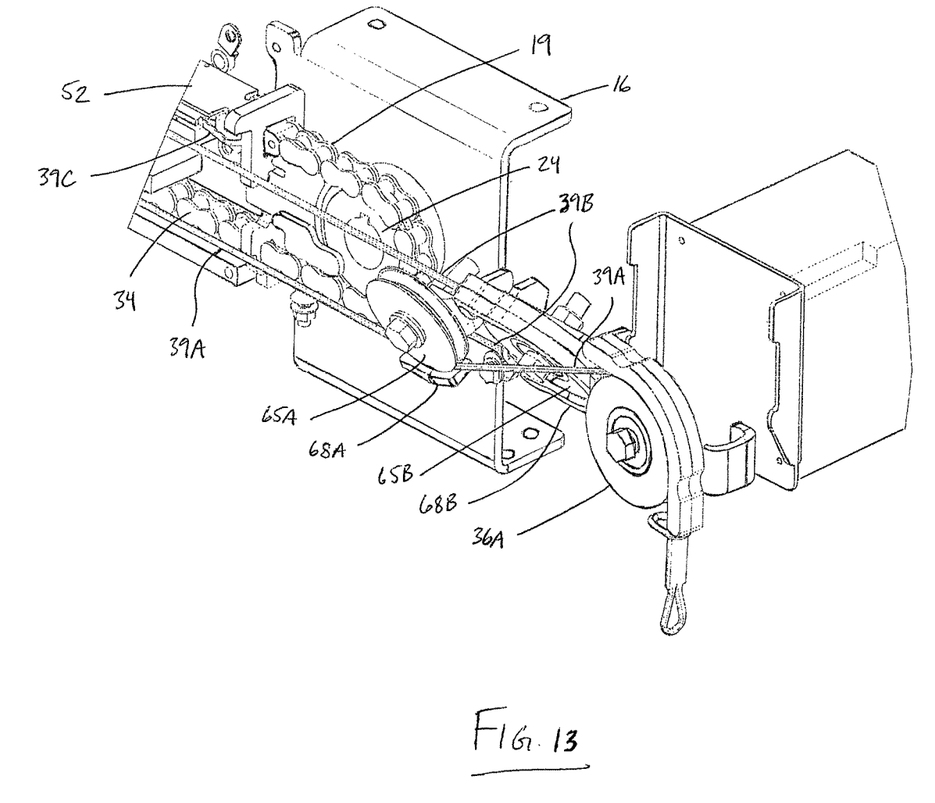
FIG. 13 is another enlarged partial view indicated at V in FIG. 11 with some components omitted for clarity of illustration.

Turning now with particular reference to FIG. 7, the dispensing pulleys 36A-D are supported for rotational movement about 44A-D axes oriented in a transverse direction to the longitudinal direction. More specifically, in the illustrated arrangement the pulley axes 44A-D are oriented horizontally such that planes of rotation $P_{P,A-D}$ of the dispensing pulleys are oriented vertically upright. Three dispensing pulleys, in the figures indicated at 36A, 36C and 36D, are located at a longitudinally spaced location from the drive chain 19, while one of the dispensing pulleys indicated 36B is positioned at a location where it coincides in longitudinal location with at least one of the runs 33, 34 of the endless loop formed by chain 19. That is, with respect to the longitudinal direction, the pulley 36B is located along one of the runs 33, 34. It will be appreciated that in other arrangements of the apparatus, there may be a different total number of dispensing pulleys and that the ratio of pulleys located outwardly of the endless loop to those overlapping in longitudinal location with the endless loop may be different.

A pair of the dispensing pulleys 36C and 36D that are longitudinally spaced from the chain 19 are supported in their rotational movement by a tubular member 47 which is mounted in coaxial relation with the upper tube 14A so that their interiors are communicated, as will be better appreciated shortly. The tubular extension member 47 is mounted to plate 17, which is oriented perpendicularly to the longitudinal direction and perpendicularly transversely to the rotational plane $P_L$ of the chain 19, and is supported by strut 49. The strut 49 extends at an incline from the plate 17 upwardly and outwardly away from the drive chain to the member 47, which is also supported by the same type of U-shaped brackets 13 mounted to the building's rafter system that support the upper tube 14A. The tubular member 47 is detachable for shipping.

At least one support cable of those at 39A-D is coupled to the upper run 33 and at least one is coupled to the lower run 34, as the runs 33, 34 are movable in opposite directions in the rotational movement of the drive chain 19. In the illustrated arrangement, two support cables are coupled to each run and extend in a common direction away from their coupling locations to the chain where this direction is parallel to the longitudinal direction and parallel to the linear path followed by the respective run 33, 34 so as to be along the respective loop run.

Figure 1:
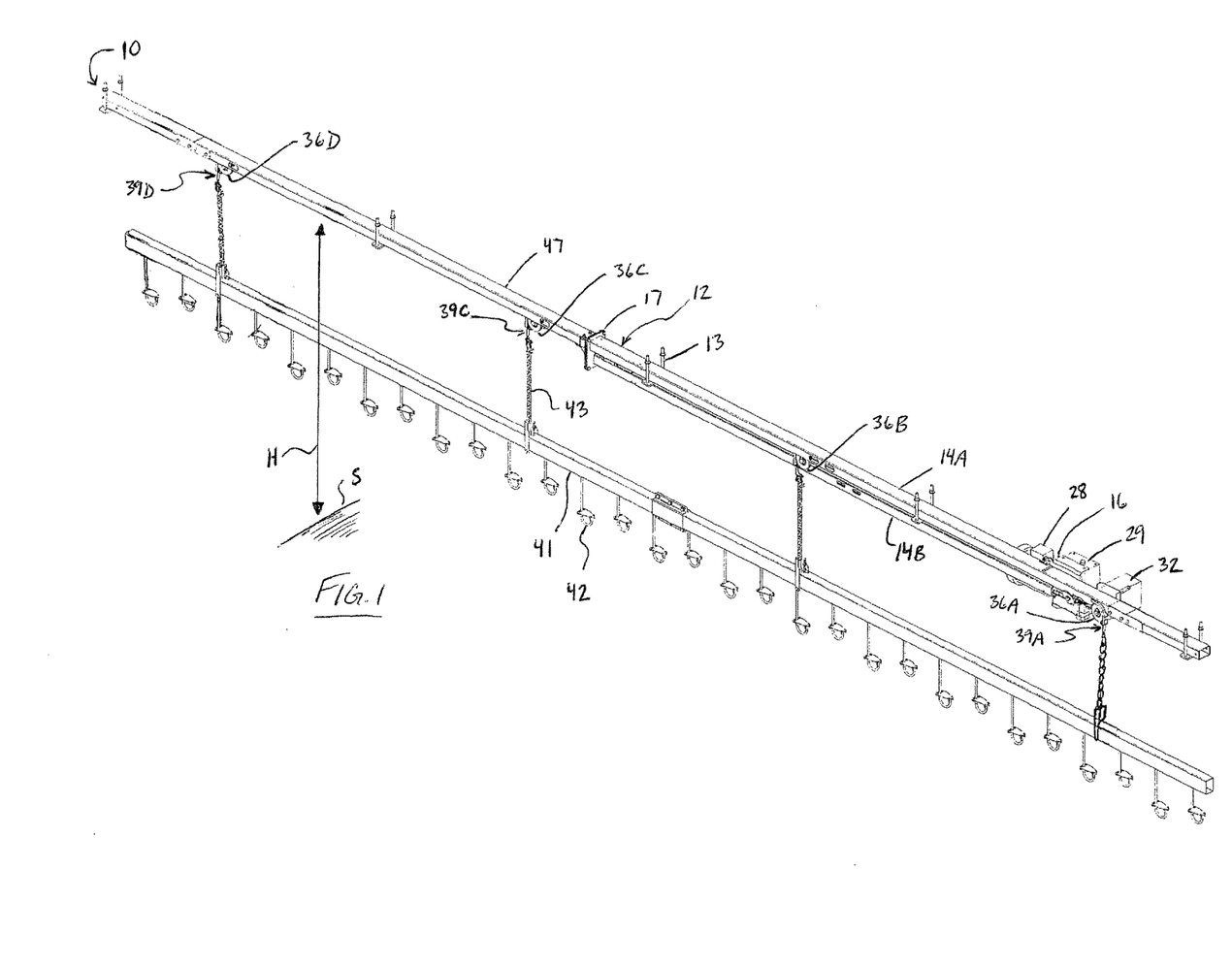
FIG. 1 is a perspective view of an arrangement of apparatus for storing objects above a floor surface according to the present invention.
Figure 2:
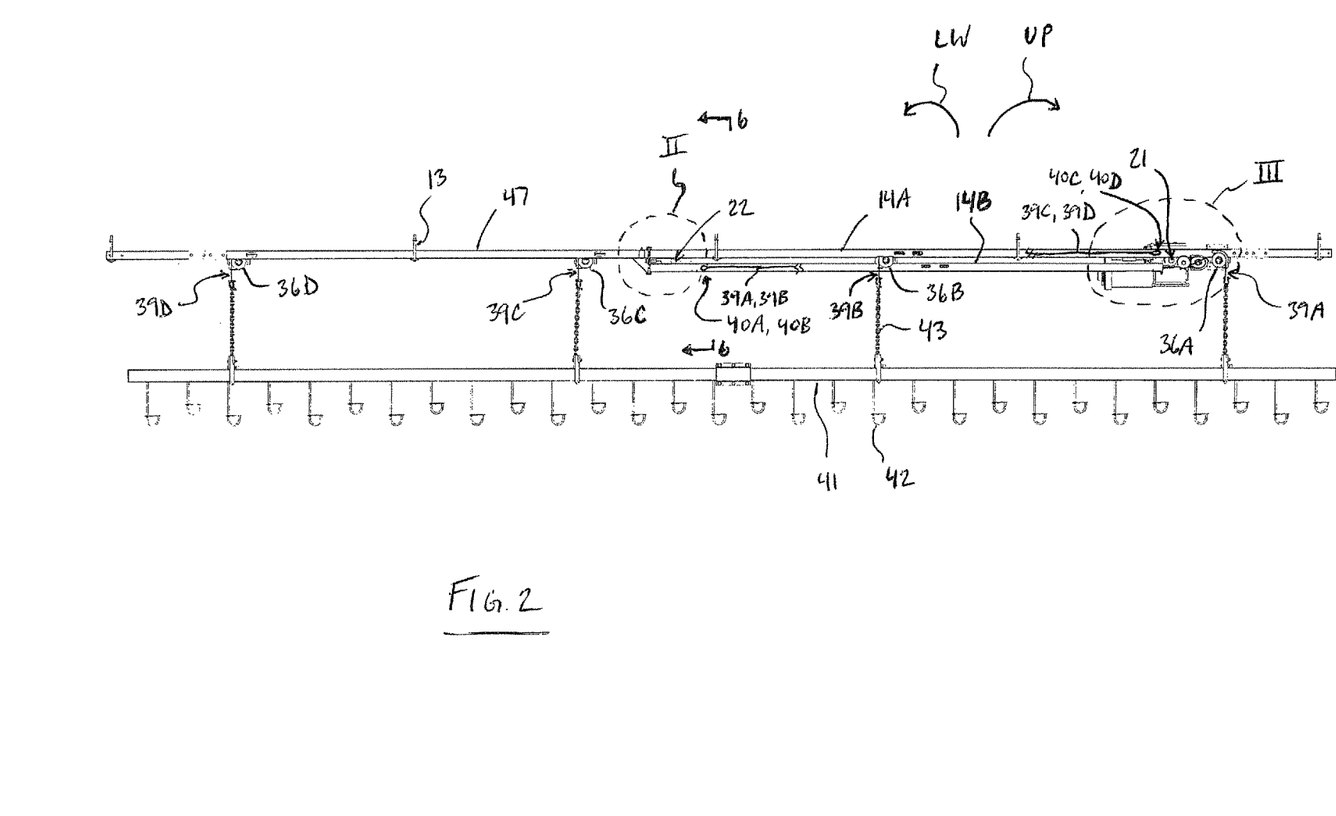
FIG. 2 is a front elevational view of the arrangement of FIG. 1.

Referring to FIG. 2, those cables 39A and 39B (schematically shown) which are coupled to the lower run 34 extend from their respective coupling locations in an opposite direction to that of cables 39C and 39D (schematically shown) which are coupled to the upper run, so that rotation of the drive chain 19 in a predetermined rotational direction causes the respective coupling locations 40A, 40B of the cables coupled to the upper run 33 to be displaced in an opposite direction to the coupling location 40C, 40D of the cables coupled to the lower run 34, whereby all cables are either retracted into the housing 10 so as to raise the support beam 41 or all cables are extended from the housing so as to lower the support beam. In the illustrated arrangement rotation of the drive chain 19 in the rotational direction designated by arrow labelled UP causes the support beam 41 to be raised, and rotation in the direction designated by arrow labelled LW causes the beam 41 to be lowered.

Figure 3:
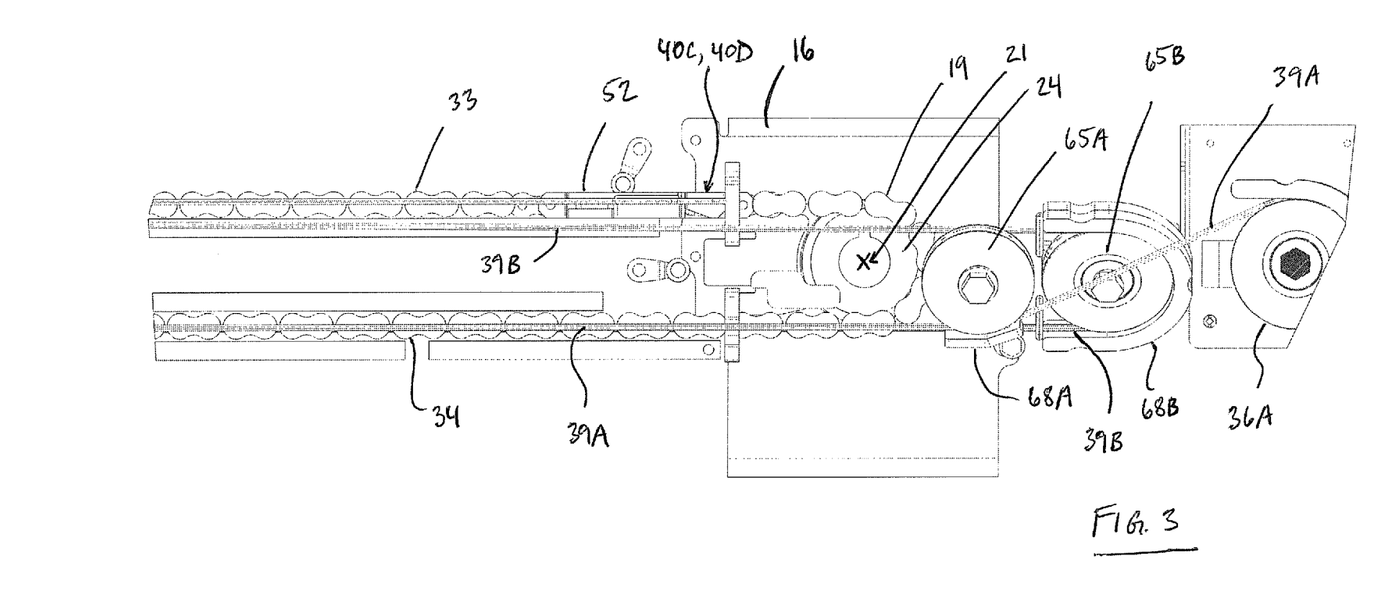
FIG. 3 is an enlarged partial view indicated at I in FIG. 2 in which some components are omitted for clarity of illustration.
Figure 4:
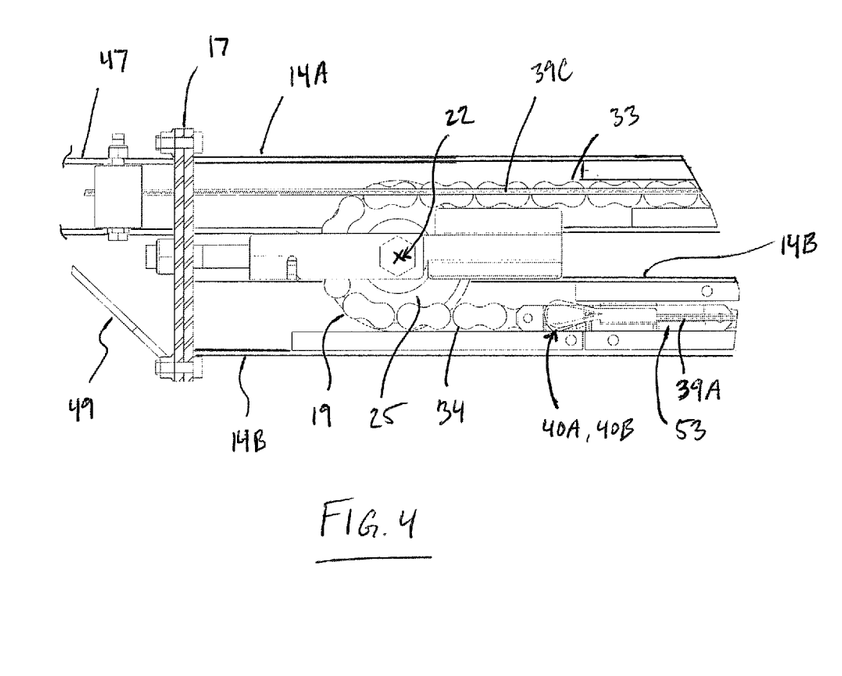
FIG. 4 is an enlarged partial view indicated at II in FIG. 2 in which some components are omitted for clarity of illustration.
Figure 5:
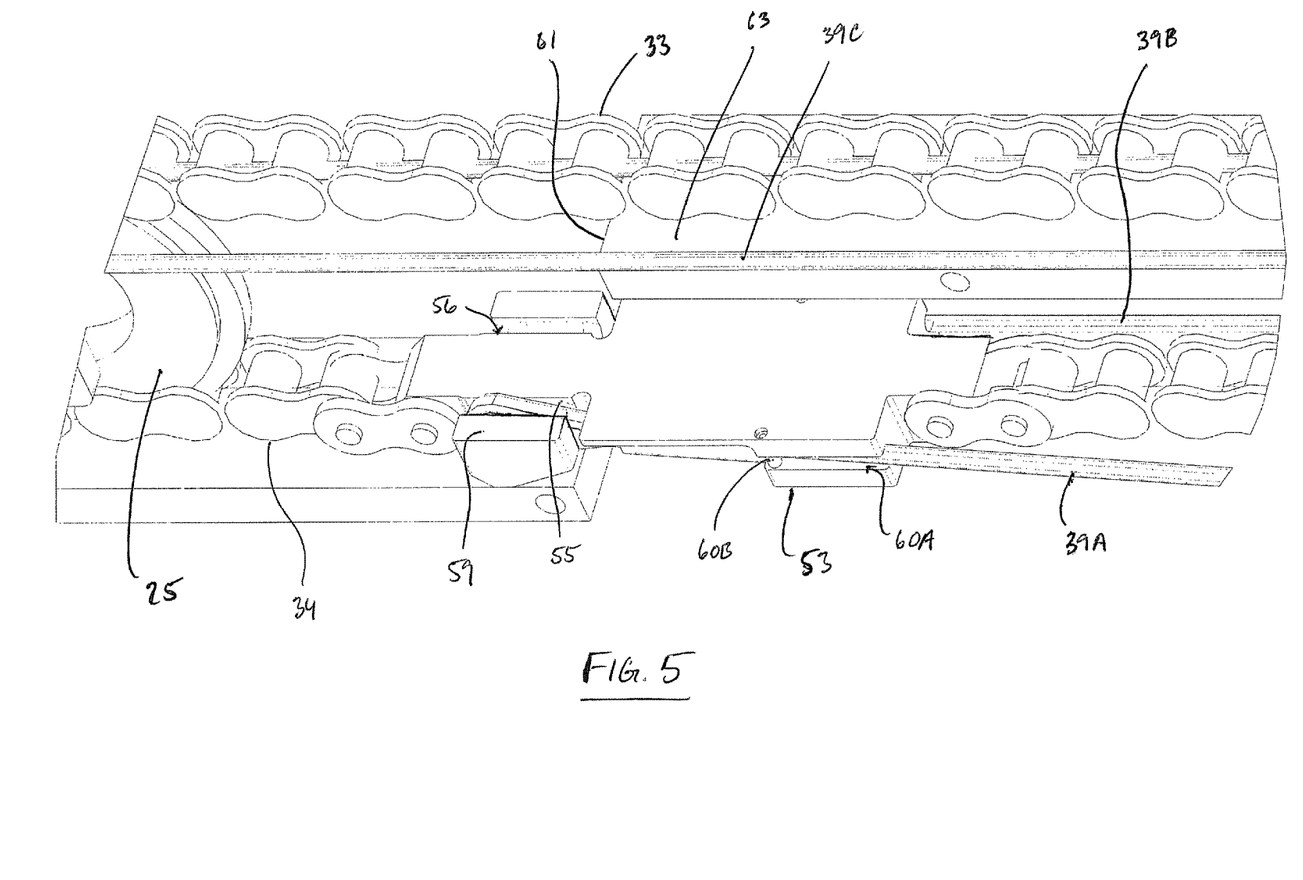
FIG. 5 is another enlarged partial view of the area indicated at II in FIG. 2 in which some components are omitted for clarity of illustration.
Figure 6:
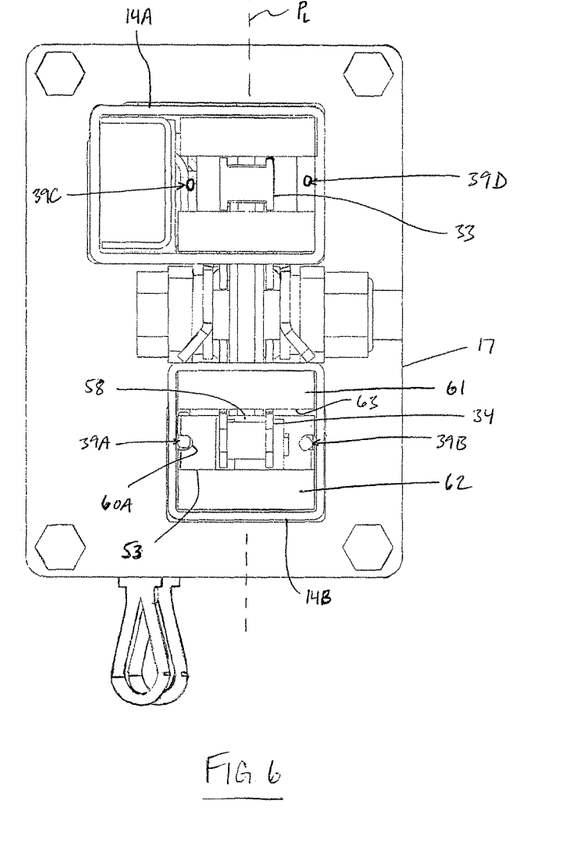
FIG. 6 is a cross-sectional view taken along line 6-6 in FIG. 2.

Referring to FIGS. 3-5, each pair of the cables which is coupled to a common run of the loop is coupled to a common mounting member 52, 53 fixedly attached to the chain 19 at that run 33 or 34 so as to move therewith, but each cable within the pair is located on either side of the run in a position which is outside the plane of rotation $P_L$ of the chain 19. The mounting members 52, 53 are located in line with the drive chain of the respective run such that the endless loop is formed by two lengths of chain coupled by the mounting members bridging between proximal ends of the two lengths of chain to form a closed loop.

Each mounting member comprises a body with side walls 55, 56 located on either side of the run that are interconnected by a bridging portion 58 extending from one side of the run to the other, passing through the plane of rotation $P_L$. At each side wall 55, 56 on the main body there extends a shaft therefrom in a perpendicularly transverse direction, at the opposite end of which is connected an upright wall 59 defining an inner surface opposite to the nearest one of the side walls 55, 56. In this space defined between opposite surfaces of the mounting member is received a small loop at a terminus of the respective support cable, the shaft of the mounting member passing through an opening defined the terminal cable loop. The cable pair is therefore attached at the side walls of the mounting member body, which in the illustrated arrangement locate each cable in a distinct plane parallel to the chain's plane of rotation $P_L$ such that the cables are spaced from one another in a direction perpendicular to the longitudinal direction. The cables extend substantially parallel to the run for the length of the housing tube 14A or 14B through which they pass.

The body of the respective mounting member defines adjacent the cable-coupling location of the mounting member a longitudinally extending guide groove 60A on either side of the member which is open at either end so that the support cable can extend from its small loop and along the mounting member and further along the corresponding run of the drive chain. The guide grooves help orient a remaining length of the support cable from its coupling location relative to the drive chain run. A removable pin 60B oriented transversely to the groove and extending between top and bottom sides of the guide groove at a spaced location from its base, which is oriented substantially parallel to the side walls 55, 56, is provided to confine the support cable to the guide groove 60A.

The main body is pivotally attached at each end to a chain link so as connect to the respective length of chain.

Skid members in the form of elongate plastic strips 61, 62 are provided along at least a majority of the length of the housing tubes 14A, 14B respectively defining a longitudinally extending guide surface 63 facing the chain of the respective run for preventing contact of the cables 39A-D and the mounting members 52, 52 with the housing tube encompassing same. A pair of the strips 61, 62 extends along each run, with one 61 being positioned within an annulus defined by the drive chain 19 and the other 62 being positioned outside the annulus such that both lie in the drive chain's plane of rotation $P_L$.

The dispensing pulleys 36A-D are located to rotate in different planes of rotation $P_{P,A-D}$ and are spaced one from the other in a direction perpendicular to the longitudinal direction so as to help avoid interference between paths of cables from their respective coupling locations to their corresponding dispensing pulleys. Thus the cables 39A-D are passed over intermediary guide pulleys 65A-D on their paths to corresponding dispensing pulleys 36A-D so as guide each cable from an initial portion of its path which is parallel to the run 33 or 34 as they extend through the tubes 14A, 14B encompassing same, clear of any obstructions to a top of the corresponding dispensing pulley so that the support cable can then depend downwardly therefrom.

For the cable pair 39C, 39D which is coupled to the upper run 33 of the chain 19, tops of the corresponding dispensing pulleys 36C and 36D are substantially disposed in horizontal linear alignment with the respective coupling locations 40C, 40D such that the intermediary guide pulleys 65C, 65D rotate about axes $A_{G,C-D}$ which are perpendicularly transverse to the longitudinal direction and parallel to the chain's plane of rotation $P_L$. The intermediary guide pulleys 65C, 65D can be in the form of rollers which are free of grooves for confining to a predetermined path a cable (or, generally speaking, a flexible link) that is passed thereover.

For the cable pair 39A, 39B which is coupled to the lower run 34, these follow paths each having an inclined portion so that the respective support cable can wrap about a top of the corresponding dispensing pulley which is located at a higher elevation than the respective cable-chain coupling location. To guide the respective support cable 39A, 39B in its inclined path there is provided intermediary guide pulley 65A, 65B about which the respective cable wraps along its bottom so as to guide without interference of other components the respective cable to the top of its corresponding dispensing pulley.

For the dispensing pulley 36A that is disposed at a longitudinally spaced position from the drive chain 19, there is provided the intermediary guide pulley 65A which with respect to the longitudinal direction is located intermediate the dispensing pulley 36A and the drive chain 19. The intermediary guide pulley 65A is positioned to rotate in an inclined plane of rotation which is transverse to the chain's rotational plane $P_L$. The dispensing pulley 36A is located in a vertically upright plane of rotation $P_{P,A}$ which is transverse to both the chain's plane of rotation $P_L$ and the intermediary guide pulley's rotational plane.

Dispensing pulley 36B is disposed at a position which overlaps in location, with respect to the longitudinal direction, both the runs 33, 34 of the drive chain. As such, the dispensing pulley 36B is spaced from the drive chain in a perpendicular direction from the rotational plane thereof $P_L$. The corresponding intermediary guide pulley 65B over which cable 39B passes is disposed at a longitudinally spaced location from the endless loop 19, and the cable 39B wraps from a bottom to a top of the guide pulley 65B so as to extend therefrom to the dispensing pulley 36B in a direction which is opposite to that in which the initial portion of the cable 39B extends from coupling location 40B to the intermediary pulley 65B. The plane of rotation of the guide pulley 65B is transverse to the chain rotational plane $P_L$. Furthermore, an angle of inclination of the rotational plane of the guide pulley 65B relative to chain rotational plane $P_L$ is greater than that of the rotational plane of the guide pulley 65A relative to the chain's rotational plane $P_L$ as a transverse distance between an upper run portion of support cable 39B extending along the upper run of the drive chain and a lower run portion of same, which extends along the lower run of the drive chain, in the perpendicularly transverse direction with respect to the endless loop is greater than a transverse distance measured in the same manner between a bottom of the guide pulley 65A receiving a lower run portion the support cable 39A and a top of the dispensing pulley 36A across which the cable 39A passes.

Thus, in the illustrated arrangement each cable extends from its respective coupling location past an end of the respective run to which it is attached, which generally coincides with longitudinal location of the parallel axes 21, 22, to a pulley which either dispenses the respective cable downwardly to the support member 42 or guides the cable along its continued path to the corresponding dispensing pulley. In this way, the mounting members 52, 53 have an obstructed range of movement along substantially the full length of the respective run between parallel axes 21, 22 as none of the support cables are dispensed at a longitudinal location coinciding with the respective chain run until that cable has first been routed over a pulley which is longitudinally spaced from the run.

As the length of the path followed by each support cable 39A-D from its respective coupling location 40A-D to the corresponding dispensing pulley 36A-D is different, each support cable has different length from the support beam 41 to its respective coupling location so that the support beam 41 can be maintained horizontal.

Arcuate guide members 68A, 68B each which follows a portion of the periphery of the corresponding guide pulley 65A, 65B are provided at certain locations so as to confine the respective cable to the groove of the respective pulley even when there is minimal tension on the support cables, that is when the support beam is free of any objecting or loads. The respective arcuate guide member extends along that portion of the periphery of the corresponding guide pulley along which the respective cable wraps and is in contact with the pulley.

In use, the apparatus 10 is operated to lower the support beam 41 to a height at which objects to be stored above the floor surface S can be suitably loaded onto the beam 41. More specifically, this lowering occurs as a result of motor 28 driving sprocket 24 to rotate the endless loop in the form of chain 19 in a first predetermined rotational direction indicated by arrow LW in FIG. 2, in which each coupling location is displaced generally towards the dispensing pulley corresponding to the cable supported by that coupling location. This is certainly the case for those dispensing pulleys located outwardly of the drive chain 19, such as 36A, 36C, and 36D. For the dispensing pulley 36B which overlaps in longitudinal location with the runs 33, 34 of the chain, in the chain's rotational movement in direction LW the respective coupling location 40B is displaced towards the intermediary guide pulley 65B whereby the support cable 39B is then rerouted in the opposite direction towards its corresponding dispensing pulley 36B. Thus, in the rotational direction that corresponds to lowering of the support member, the cable-chain coupling locations are displaced in a direction by which distance, along the path of the respective support cable, between its coupling location and its dispensing pulley is reduced.

Once the beam 41 is ready to be raised to a suitable storage height at which the objects carried thereby are spaced above the floor surface S, the motor 28 is operated via controller 32 to drive sprocket 24 to rotate the drive chain 19 in a second, opposite predetermined rotational direction UP. In chain rotation in the direction UP, the mounting members 52, 53 and therefore the coupling locations 40A-D are displaced in a manner increasing the span of support cable between the respective coupling location and the corresponding dispensing pulley. For the dispensing pulleys 36A, 36C and 36D, in the direction UP the coupling locations of the corresponding support cables move in a direction away from the dispensing pulley. For dispensing pulley 36B, the coupling location of the corresponding support cable moves away from the intermediary guide pulley 65B.

The scope of the claims should not be limited by the preferred embodiments set forth in the examples but should be given the broadest interpretation consistent with the specification as a whole.

The invention claimed is:

1. An apparatus for storing objects above a floor surface, comprising:

a housing, which is elongated in a longitudinal direction, arranged for mounting at a prescribed height above the floor surface;

an endless loop driven for rotational movement about a pair of spaced parallel axes defined by members carried at the housing;

the endless loop having first and second runs of the loop which extend substantially parallel to the longitudinal direction, the first and second runs being movable in opposite directions in the rotational movement of the endless loop;

a plurality of pulleys at longitudinally spaced locations of the housing which are supported for rotational movement about axes oriented in a transverse direction to the longitudinal direction;

a plurality of flexible links coupled to the endless loop and each extending therefrom substantially parallel to the longitudinal direction to a respective one of the pulleys;

the flexible links wrapping about the pulleys so as to depend downwardly therefrom;

a support member for carrying the objects above the floor surface that extends substantially parallel to the longitudinal direction of the housing and is coupled to the flexible links so that the rotational movement of the endless loop causes the support member to be raised and lowered;

a first one of the flexible links being coupled to the first run of the endless loop and a second one of the flexible links being coupled to the second run;

and each of the first and second flexible links extending from a respective coupling location to a corresponding one of the pulleys in an opposite direction to the other one of the first and second flexible links so that rotation of the endless loop in a predetermined rotational direction causes the respective coupling locations of the first and second flexible links to be displaced in opposite directions whereby both the first and second flexible links are retracted into the housing or extended therefrom so as to cooperate to raise or lower the support member.

2. The apparatus according to claim 1 wherein more than one of the flexible links extends in a common one of the opposite directions from respective coupling locations to corresponding ones of the pulleys.

3. The apparatus according to claim 2 wherein the more than one of the flexible links extending in the common one of the opposite directions are coupled to a common mounting member which is fixedly attached to the endless loop.

4. The apparatus according to claim 3 wherein the flexible links coupled to the common mounting member are arranged on either side of the respective run of the endless loop.

5. The apparatus according to claim 1 wherein the pulleys from which the flexible links depend downwardly are located to rotate in different planes of rotation.

6. The apparatus according to claim 1 wherein the pulleys from which the flexible links depend downwardly are spaced from one another in a direction perpendicular to the longitudinal direction of the housing.

7. The apparatus according to claim 1 wherein each flexible link at its coupling location to the endless loop is spaced from the other in a direction perpendicular to the longitudinal direction of the housing.

8. The apparatus according to claim 1 wherein the endless loop is positioned to rotate in an upright plane of rotation.

9. The apparatus according to claim 8 wherein the respective flexible link coupled to a lower one of the first and second runs of the endless loop follows an inclined path therefrom to the corresponding one of the pulleys.

10. The apparatus according to claim 9 wherein the respective flexible link coupled to the lower one of the first and second runs is passed over an intermediary pulley in its path to the corresponding one of the pulleys wherefrom the respective flexible link depends downwardly.

11. The apparatus according to claim 1 wherein:
one of the pulleys, from which the flexible links depend downwardly, is located, with respect to the longitudinal direction of the housing, along one of the first and second runs of the endless loop;

and the respective flexible link corresponding to said one of the pulleys extends from its respective coupling location in the longitudinal direction to an intermediary pulley disposed at a longitudinally spaced location from the endless loop, the respective flexible link wrapping about the intermediary pulley and extending therefrom in an opposite longitudinal direction to said one of the pulleys from which the respective link depends downwardly.

12. The apparatus according to claim 11 wherein the intermediary pulley that is longitudinally spaced from the endless loop is positioned to rotate in a plane of rotation transverse with respect to a plane of rotation of the endless loop.

13. The apparatus according to claim 1 wherein each of the first and second runs of the endless loop are encompassed by a separate tubular member extending along a respective one of the first and second runs.

14. The apparatus according to claim 1 wherein there are provided skid members extending along a respective one of the first and second runs of the loop positioned to lie in a plane of rotation of the endless loop.

15. The apparatus according to claim 1 wherein each flexible link has a different length from its respective coupling location to the support member.

* * * * *